US011328033B2

(12) United States Patent
Golan et al.

(10) Patent No.: US 11,328,033 B2
(45) Date of Patent: May 10, 2022

(54) DYNAMIC INSERTION OF INTERMEDIATE CONTENT PAGE

(71) Applicant: TABOOLA.COM LTD., Ramat Gan (IL)

(72) Inventors: Lior Golan, Tel Aviv (IL); Elad Gov-Ari, Holon (IL)

(73) Assignee: TABOOLA.COM LTD., Ramat Gan (IL)

( * ) Notice: Subject to any disclaimer, the term of this patent is extended or adjusted under 35 U.S.C. 154(b) by 0 days.

(21) Appl. No.: 17/506,399

(22) Filed: Oct. 20, 2021

(65) Prior Publication Data

US 2022/0058235 A1 Feb. 24, 2022

Related U.S. Application Data

(63) Continuation of application No. 16/952,779, filed on Nov. 19, 2020.

(60) Provisional application No. 62/938,593, filed on Nov. 21, 2019.

(51) Int. Cl.
*H04L 29/08* (2006.01)
*G06F 16/955* (2019.01)
*H04L 67/50* (2022.01)
*H04L 67/02* (2022.01)

(52) U.S. Cl.
CPC ...... *G06F 16/9566* (2019.01); *G06F 16/9558* (2019.01); *H04L 67/22* (2013.01); *H04L 67/02* (2013.01)

(58) Field of Classification Search
CPC . H04L 63/1433; H04L 63/1416; H04L 67/22; H04L 67/02; G06F 16/9558; G06F 16/9566; G06F 16/958; G06F 21/56; G06F 2221/2119
See application file for complete search history.

(56) References Cited

U.S. PATENT DOCUMENTS

| 2005/0149576 | A1* | 7/2005 | Marmaros | G06F 16/9558 |
| 2009/0132481 | A1* | 5/2009 | Toub | G06F 16/958 |
| 2009/0282052 | A1* | 11/2009 | Evans | G06Q 30/02 |
| 2011/0087648 | A1* | 4/2011 | Wang | G06F 21/56 |
| | | | | 707/709 |
| 2014/0095326 | A1* | 4/2014 | Adam | G06Q 30/0273 |
| | | | | 705/14.73 |

(Continued)

OTHER PUBLICATIONS

Non-Final Office Action for corresponding family U.S. Appl. No. 16/952,779, dated Jun. 18, 2021.

*Primary Examiner* — Jungwon Chang
(74) *Attorney, Agent, or Firm* — Myers Wolin, LLC

(57) ABSTRACT

A method, product, and system for inserting intermediate content page. An exemplary method comprises displaying to a user a first webpage followed by a second webpage; and in response to an instruction to return to a previous location from the second webpage, displaying an intermediate content webpage that comprises a feed element displaying sponsored or organic content. Another method comprises monitoring browsing activity of a user, in which the user reaches from a first webpage to a second webpage, and causing an intermediate content webpage to be displayed the user instead of the first webpage in response to a user instruction to implement the previous location functionality at the second webpage.

28 Claims, 5 Drawing Sheets

(56) References Cited

U.S. PATENT DOCUMENTS

2018/0027085 A1\* 1/2018 Stanislaw ............... H04L 67/22
                                                        709/224
2019/0207973 A1   7/2019 Peng
2019/0251129 A1\* 8/2019 Barbare .............. G06F 16/9574

\* cited by examiner

DYNAMIC INSERTION OF INTERMEDIATE CONTENT PAGE

CROSS-REFERENCE TO RELATED APPLICATION

This application is a continuation of and claims the benefit U.S. patent application Ser. No. 16/952,779, entitled "REFERRAL INFORMATION DETERMINATION AND UTILIZATION", filed Nov. 19, 2020, which claims the benefit of provisional patent application No. 62/938,593 filed Nov. 21, 2019, titled "Dark Social Referrals", all of which are hereby incorporated by reference in their entirety without giving rise to disavowment.

TECHNICAL FIELD

The present disclosure relates to determining an origin of traffic in general, and to systems, products, and methods for determining and utilizing referral information of resource requests, in particular.

BACKGROUND

Social shares and traffic may not always contain referral information regarding a source of the traffic. This phenomenon is sometimes referred to as "dark social". Dark social traffic includes private social shares that are shared through Internet Relay Chat (IRC) channels, Electronic mails (emails), Short Message Service (SMS), copy-and-pastes, or any other private messaging mediums, and do not contain digital referral information. For example, a link to a webpage that is shared through an SMS message cannot be tracked by the owner of the webpage. Additional types of traffic may not contain valid referral information for a variety of reasons.

In some exemplary embodiments, as there is an increase in use of mobile applications, which many times replace traditional websites or web-based applications, there may be an increase in traffic that lacks valid referral information. The percentage of traffic that has an untraceable source is estimated to be between 30 and 80 percent of all traffic.

BRIEF SUMMARY

One exemplary embodiment of the disclosed subject matter is a method comprising: obtaining a webpage request from an in-app browser of an application of a user device, wherein the webpage request is configured to request a webpage or a portion thereof from a server, wherein the webpage request comprises a user-agent field; identifying that the webpage request has no valid referral information; and based on the webpage request, determining artificial referral information of the webpage request, wherein the artificial referral information indicates a referral source of the webpage request.

Optionally, the artificial referral information indicates that the referral source is associated with the in-app browser of the application, with the application, or the like.

Optionally, the artificial referral information indicates that the referral source is associated with a source webpage that is rendered prior to rendering the webpage.

Optionally, determining the artificial referral information comprises utilizing a library to convert the user-agent field to conversion information indicating the referral source.

Optionally, the method comprises normalizing the conversion information to provide a unified representation of the referral source, thereby obtaining the artificial referral information.

Optionally, determining the artificial referral information comprises obtaining an identifier of the referral source from the referral source, and utilizing the identifier to determine the artificial referral information.

Optionally, determining the artificial referral information comprises monitoring user activities of a user of the user device, and estimating a probable referral source comprising the referral source based on the user activities.

Optionally, determining the artificial referral information comprises monitoring a list of active sources of the webpage, and estimating a probable referral source based on the list.

Optionally, determining the artificial referral information comprises utilizing a trained classifier to correlate between at least one field of the webpage request and the referral source, wherein determining the artificial referral information comprises utilizing a result of the trained classifier in case a confidence score of the result complies with a confidence threshold.

Optionally, the method may comprise retaining the artificial referral information in a database, and training a classifier to determine artificial referral information of user traffic based on referral information of similar user traffic as indicated by the database, wherein the similar user traffic is determined based on a similarity criteria.

Optionally, the in-app browser may comprise a link to the webpage, wherein the webpage request is generated upon a user selection of the link.

Optionally, determining that the value of the referral information is invalid may comprise identifying that the value cannot be used to determine the referral source of the webpage request.

Optionally, the method may comprise modifying a response to the webpage request based on the artificial referral information, wherein the response comprises serving the webpage to the user device.

Optionally, the method may comprise inserting an intermediate content page to a browsing history of the user device, wherein said inserting comprises placing the intermediate content page in a location of the history that is prior to the webpage and adjacently thereto, thereby causing the intermediate content page to be displayed in response to a return command.

Optionally, the method may comprise obtaining a return command instructing to return from the webpage to a previous webpage; and causing an intermediate content page to be displayed in response to the return command, instead of the previous webpage, wherein, upon receiving a second return command, causing the previous webpage to be displayed to the user.

Optionally, the intermediate content page is characterized in having an organic User Experience (UX) that matches the UX of the application.

Optionally, the user-agent field comprises a user-agent request header of a Hypertext Transfer Protocol (HTTP) packet.

Optionally, identifying that the webpage request has no valid referral information comprises determining that an HTTP header of the webpage request lacks a Referrer request header or that the Referrer request header comprises a value that cannot be used to determine the referral source of the webpage request.

Another exemplary embodiment of the disclosed subject matter is a computer program product including a non-transitory computer readable storage medium retaining program instructions, which program instructions when read by a processor, cause the processor to: obtain a webpage request from an in-app browser of an application of a user device, wherein the webpage request is configured to request a webpage or a portion thereof from a server, wherein the webpage request comprises a user-agent field; identify that the webpage request has no valid referral information; and based on the webpage request, determine artificial referral information of the webpage request, wherein the artificial referral information indicates a referral source of the webpage request.

Yet another exemplary embodiment of the disclosed subject matter is a system comprising a processor and coupled memory, the processor being adapted to: obtain a webpage request from an application of a user device, wherein the webpage request is configured to request a webpage or a portion thereof from a server, wherein the webpage request comprises a user-agent field; identify that the webpage request has no valid referral information; and based on the webpage request, determine artificial referral information of the webpage request, wherein the artificial referral information indicates that a referral source of the webpage request is the application.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
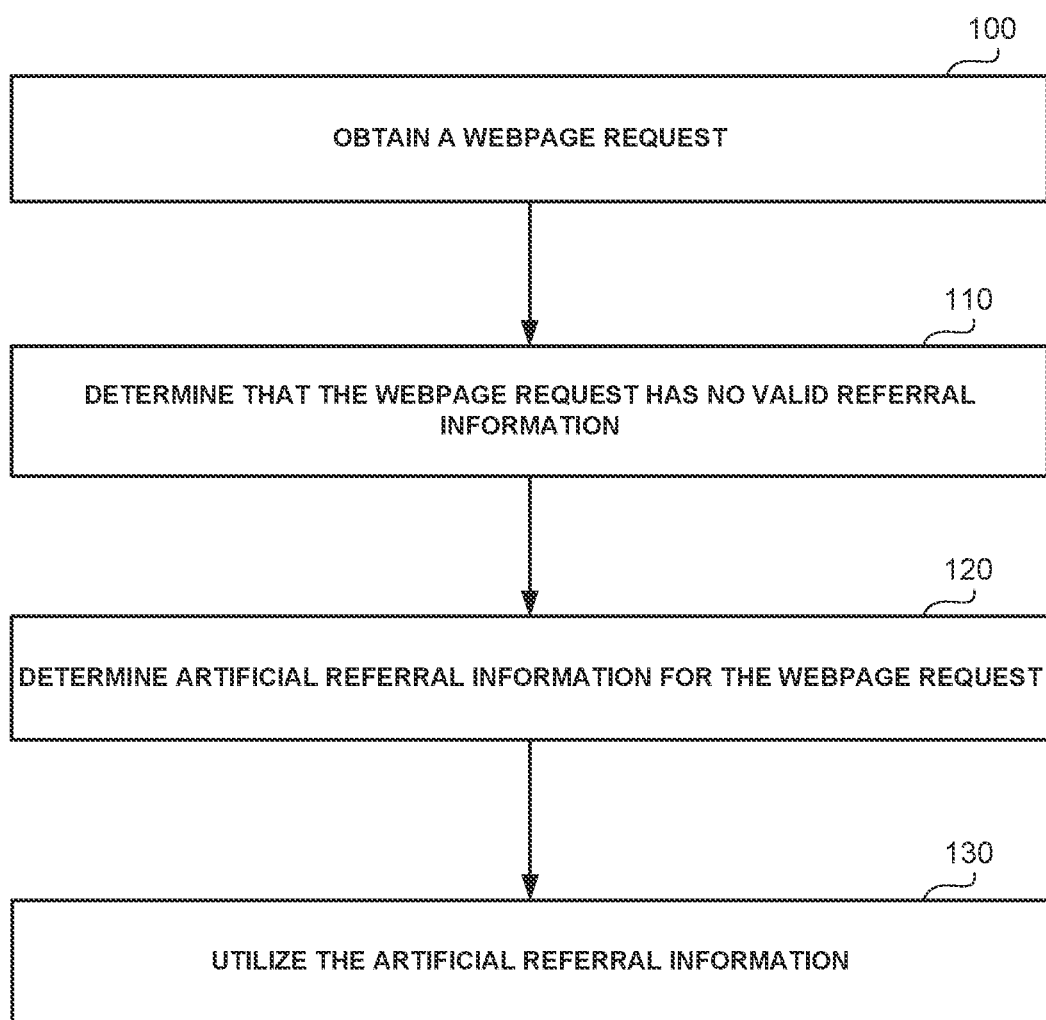
FIG. 1 shows a flowchart diagram of a method, in accordance with some exemplary embodiments of the disclosed subject matter.

One technical problem dealt with by the disclosed subject matter is to identify a referral source of digital traffic in case the traffic does not comprise accurate referral information (such traffic may be referred to as "untraceable traffic"). In some exemplary embodiments, digital media may be obtained and consumed using various technologies, in different platforms and contexts, many of which may be untraceable due to various reasons. In some exemplary embodiments, lacking valid referral information may cause traffic to become untraceable. In some exemplary embodiments, it may be desired to label untraceable digital traffic accurately according to its referral source.

A common term for some types of untraceable traffic is "dark social" (also known as "dark social media" or "dark traffic"), which refers to social sharing that cannot be accurately tracked and therefore cannot be accurately monitored or processed by web analytics platforms. For example, dark social includes private social shares that are shared through private platforms such as Internet Relay Chat (IRC) channels, Electronic mails (emails), Short Message Service (SMS), or through any other private sharing medium, and therefore include untraceable traffic. Dark social may include traffic such as shares of content that do not contain accurate digital referral information about their source, thereby disabling any analysis that utilized the traffic source. Such shares may occur outside of what can be measured by common web analytics programs. In some exemplary embodiments, private social mediums may include a plurality of mediums such as native mobile applications including the INSTAGRAM™ application, web-based Emails, native or web-based messaging applications such as WHATSAPP™, WECHAT™, FACEBOOK™ Messenger, KIK™, or the like, which refrain from passing on referral data.

In some exemplary embodiments, untraceable traffic may comprise traffic that has no valid, complete or accurate referral information, regardless of the social nature of the traffic. In some exemplary embodiments, untraceable traffic may comprise dark social shares as well as any other type of traffic that may be untraceable. In some exemplary embodiments, the digital content may be requested or consumed by a user, user device, an automatic process, or the like. In some exemplary embodiments, the digital content that is requested may comprise a website, an image, a video, a snippet, a widget, a code, scripts, content, advertisements, other digital resources or parts thereof, herein referred to as "website", "webpage" or "page", or portions thereof, for the sake of simplicity. For example, when a visitor consumes a target website via a dark social referral, e.g., via a private social share, the source of such traffic, such as a previous webpage including the link that the visitor followed, an application from which the link was followed, or the like, may be untraceable. In some cases, traffic may have no valid referral information when a HyperText Transfer Protocol (HTTP) packet requesting the target website is absent of any referrer information fields in the HTTP headers. In such cases, the user's request for content may be considered as untraceable traffic, e.g., in analytics reports that analyze traffic according to its origin or source. In some cases, even if an HTTP packet requesting a resource comprises one or more referrer information fields, they may not provide valid information as they may be noisy, inaccurate or lacking in the traffic data, e.g., due to implementation bugs in software or hardware, communication problems, unavailability of certain resources, due to deliberate actions or intended behavior, security policies, or the like.

In some cases, untraceable traffic may have no valid referral information in a non-social context, in a context that does not occur via a private sharing medium, or the like. For example, referring parties may deliberately avoid sending any referral information for security or policy reasons, e.g., in order to enhance a privacy of a user, to comply with regulations, or the like. As another example, referrals to webpages that occur through an embedded browser within a software application (referred to as an "in-app browser" or a "WebView"), may not comprise digital referral information, and may thus be considered as untraceable traffic. In some exemplary embodiments, in-app browsers may provide full or limited browsing functionality. As an example, a user may follow a link from an application such as FACEBOOK™, WHATSAPP™, APPLE NEWS™ application, or the like. An associated webpage (pointed to by the link the user followed) may be opened in the in-app browser of the application, in an independent browser, in the default browser, or the like, possibly without referrer information. Additional examples of untraceable traffic may include a page opened in a new tab of the browser; a page reached from a WHATSAPP™ application; or the like.

Another technical problem dealt with by the disclosed subject matter is to identify whether or not identified referral information is valid. For example, it may be desired to determine whether one or more referral information fields of an HTTP packet are accurate or whether they comprise noisy or otherwise inaccurate or incomplete information. In some exemplary embodiments, identified referral information may not be valid for a plurality of reasons.

In some exemplary embodiments, digital media such as a webpage may be obtained and consumed via HTTP communications, e.g., HTTP requests and responses, using a client's browser software or any other software. In some exemplary embodiments, traffic from public social mediums (referred to as "traceable traffic") such as TWITTER™ or LINKEDIN™, may typically provide accurate referral information to analytics platform via HTTP communications. The browser software may, in such cases, include in its HTTP request referral information regarding the origin or source of the traffic. In some exemplary embodiments, HTTP requests may typically indicate the source of traffic using an HTTP referrer, an HTTP header, other metadata and parameters, or the like. In some exemplary embodiments, HTTP Headers may comprise a referrer field, such as a Referrer request header (also known as the "Referer request header", MIC) or "HTTP Referrer", containing an address of a previous webpage such as a Uniform Resource Locator (URL) of the previous webpage from which a link to the currently requested page was followed (also referred to as the referring page). In some exemplary embodiments, such practice may allow servers to use that data for a plurality of purposes such as analytics, personalization of digital content, functionality enhancement of digital content, logging, optimized caching, or the like.

In some exemplary embodiments, in case of a direct consumption of digital content, the consumption may be labeled as having a direct link origin, also referred to as "direct referring" or "direct traffic". In some exemplary embodiments, direct referring may comprise manual typing of the webpage's URL, a session starting from a homepage, a session starting from a bookmark, or the like. As an example, entering a homepage of a website such as the CNN™ website by typing its URL (www.cnn.com), may be considered as a direct referral, e.g., since the user reached the website directly without being referred from another entity, such as other user, website, application, advertisement, search engine, or the like.

In some exemplary embodiments, untraceable traffic may be caused due to referrer fraud. In some exemplary embodiments, referrer fraud may be implemented by manipulating digital traffic, to confuse or misdirect analytics services, ad servers, or other parties processing the traffic. In some exemplary embodiments, the referrer fraud may be implemented by a malicious source, a malicious application, or any other malicious entity with access to manipulating traffic originating from a source. As an example, a malicious entity may provide as part of the referrer information of the HTTP request originating from a certain source, referrer informa-tion of a source other than that certain source, or introduce noise and skewness to that referrer information. As another example, a malicious source (e.g., a malicious website) may falsely pretend to be the source of traffic that has not originated from it. As another example, a malicious source may be a fake news website who may include referrer information of a legitimate news source in the HTTP request, falsely indicating to the target of the traffic that credible news agency directs traffic to a specific article. As yet another example, a malicious third-party may attempt to skew the data of the target of the traffic in a dynamic manner for his purposes.

In some exemplary embodiments, referrer fraud may be implemented by a non-malicious party that may deliberately or unintentionally modify or exclude altogether referrer information in certain cases, for example, due to security or privacy concerns. As an example, a "reset password" webpage, allowing a user to reset her password, may include in its referrer information (for example, in its URL) a reset token or other sensitive data that may be leveraged by a malicious party, e.g., to reset the password for that user or otherwise cause security issues. In certain embodiments, any web request sent from such webpage may include that sensitive data in its referrer information, thereby exposing it to a potentially malicious party. For example, sensitive data may be exposed in case the user follows any link from that webpage, or when loading an <img> tag or using any other third-party service without the need for further action by the user. One approach to mitigate such risks is to configure the "reset password" webpage to deliberately modify or exclude altogether the referrer information sent from that webpage, or from other webpages in that site, to any third-party service.

Yet another technical problem dealt with by the disclosed subject matter is to identify an accurate referral source of traffic that was wrongfully labeled as direct referring, e.g., by one or more servers handling the traffic. As an example, a user named Alice may use a news application to read articles, and send a URL of a selected article to her friend Bella via an internet-based private messaging application. Such a case may be considered as dark social sharing. Specifically, when Bella follows the URL link and consumes the article, the news application team of the news application will identify a "direct" entrance to the article, although Bella has not found the article herself or manually typed the article's address, and was referred to the article by Alice's message. In contrary to direct referring, dark social referring may comprise consumption of a landing page that is not the homepage, without being able to infer an origin of the consumption.

In some exemplary embodiments, in some scenarios, HTTP requests may not include a referrer field at all, or may include a referrer field that is not valid, not accurate, not complete, or the like. In some exemplary embodiments, in such cases, one or more servers handling a user's request for content may assume that the content was requested directly by a direct referral, e.g., by manually typing the address, by manually finding the content in the homepage feed, via bookmarks, or the like. In some exemplary embodiments, inaccurate referral labeling may reduce an accuracy of the analysis of traffic data and resulting statistics, which may be generated, for example, by a web analytics program or process, a web analytics professional, or the like. In some exemplary embodiments, inaccurate referral labeling may cause real-time processes that perform real-time optimizations and adaptations to become infeasible. In some exemplary embodiments, real time processes that may become infeasible due to inaccurate referral labeling may include real time serving of content (e.g., advertisement content), real time functionality adaption, real time user experience adaption, real time modification of internal information such as adapting real-time bids of advertisements, or the like. In some exemplary embodiments, traffic that is labeled as direct traffic may be estimated as being wrongfully labeled in cases that it is unlikely that a person would manually type a long URL string such as 'www.nytimes.com/2020/08/21/science/space-telescope-puerto-rico-recibo.html' into the address bar of their browser, in case no referral information is identified, or the like.

In some exemplary embodiments, one scenario that causes traffic to be wrongfully labeled as direct referring is using in-app browsers or WebViews. In some exemplary embodiments, in-app browsers may be operated by a mobile application, e.g., native or web-based. For example, when using a mobile device, a user may follow a link in a FACEBOOK™ application, thereby opening a target webpage within an in-app browser of the FACEBOOK™ application. In such a case, the target webpage may lack referrer information, which may not be provided by the WebView of the FACEBOOK™ application. In such cases, the target webpage may label the user's consumption of the webpage as allegedly originating from a direct link, regardless of being referred from the FACEBOOK™ application. In some exemplary embodiments, in-app browsers may include CHROME™ Custom Tabs, SAFARI™ ViewController, or the like. As an example, following links using an in-app browser may seem to the handling server like a visit from a direct link. In some cases, footprints left by an in-app browser, if such exist, may not be accessible in an analysis of traffic data, for example in analytics platforms used for analysis of traffic and for optimizing served advertisements.

In some exemplary embodiments, traffic may be wrongfully labeled as direct referring in case of following a link from a Portable Document Format (PDF) file, thereby causing a new session to start. Additionally, in some scenarios, when selecting an opening option of a link, e.g., "open in CHROME™", the traffic to the linked content may be untraceable, e.g., depending on one or more factors such as whether or not a new session has been initiated, whether or not "cookie" information is retained, or the like. In some exemplary embodiments, traffic may be untraceable when opening a new tab, when using private messaging mediums such as emails and instant messaging messages, or the like. In some scenarios, browsers may not pass on known referral data for privacy or security reasons, e.g., when moving from HTTPS mode to HTTP mode. In some exemplary embodiments, traffic may be wrongfully labeled as direct referring due to referrer fraud. In some exemplary embodiments, referrer fraud may comprise digital traffic that is manipulated, e.g., by modifying or excluding referrer information, which may be implemented by a malicious or non-malicious entity. In some exemplary embodiments, in some cases, the digital traffic may be manipulated in a manner that causes handling servers to infer that a direct referral has occurred.

Yet another technical problem dealt with by the disclosed subject matter is to solve the dark social problem. In some exemplary embodiments, the dark social problem may include identifying dark social traffic as such, and finding a referral source thereof. It may be noted that this problem exists in the art for a long period of time without solution. Although such a challenge exists for years, to this date, there is no known solution thereto. As dark social traffic may not seem to have a specific source, it may create a challenge for any entity or machine who is trying to monitor or process website traffic and identify referrals or social media activity. Dark social traffic may be unassociated with a tracking code automatically appended to their Uniform Resource Locators (URLs), or with other metadata or referrer information indicative of the origin or source, and it may be challenging to determine how the website visitor reached the target website or how she was referred to it, e.g., without using the currently disclosed subject matter. For example, a website owner may monitor website visits without being able to determine referral information of some of the website visits, e.g., in case they are untraceable, exclude referral information, or the like. In some exemplary embodiments, without using the currently disclosed subject matter, analytics platforms or processes may not be able to differentiate between direct traffic and traffic arriving via dark socials that may come from untraceable referrals, or distinguish between different types of dark social referrals to identify an accurate referral source. In some exemplary embodiments, dark social traffic may not be correctly analyzed, or at some cases, may not be detected at all by web analytics software.

In some exemplary embodiments, tracing referral sources of untraceable traffic such as dark social traffic may be essential for web analytics, for content recommender systems, as well as for other methods, processes and systems involving analysis of traffic data. In some cases, missing referral source information may result with ineffective or inefficient resource allocation of advertising. In some exemplary embodiments, untraceable traffic may reduce an accuracy of analytics, reduce an accuracy of digital content personalization, or the like. Specifically, attributing traffic to wrong channels, or to wrong distribution thereof, provides advertisers and publishers of content with an incomplete picture of the situation, thereby reducing an ability to perform optimizations and adaptations of content serving processes, informed and efficient internal calculations, accurate real time or offline bidding value adaptions, or the like.

One technical solution provided by the disclosed subject matter is to determine whether valid referral information exists in an HTTP request, and in case it lacks such information, to utilize other portions of HTTP Headers and infer therefrom referral information. In some exemplary embodiments, an HTTP request of any type may be initiated or firstly generated by an application, a user device, a browser, a browser rendering a source webpage, e.g., a first webpage, by an application rendering a source page, or from any other platform or location (referred to hereinafter as "source webpage"). The source webpage may be rendered, prior to rendering the requested webpage, in an application, in an in-app browser of an application of a user device, or in any other location such as a private messaging medium. In some exemplary embodiments, the application rendering the source webpage may comprise a native application, a web application, a hybrid application, or the like. In some exemplary embodiments, an HTTP request or any other type of resource request (referred hereinafter as "webpage request") may send data, receive data, or send and receive data. In some exemplary embodiments, a webpage request may be associated with a target webpage (also referred to as a "second webpage" and "requested webpage"), e.g., requesting the target webpage, requesting visual or non-visual portions thereof, providing analytics data, or the like. In some exemplary embodiments, the webpage request may comprise one or more fields or HTTP headers such as a user-agent field, a Referrer request header, Urchin Tracking Module (UTM) parameters, or the like. In some exemplary embodiments, the webpage request may be configured to request a resource such as a second webpage, e.g., which may be obtained from a network server or from any other computing device. In some exemplary embodiments, one or more supplement webpage requests may be generated after rendering the second webpage or portions thereof, e.g., generated by a browser rendering the second webpage, generated by the second webpage or code embedded therein, or the like. In some exemplary embodiments, the supplement webpage requests may be configured to request, from one or more servers, supplement data such as additional or alternative content for the second webpage, code, scripts, supplement images, videos, snippets, widgets, advertisements, portions thereof, other data associated with the second webpage, or the like (generally referred herein as "portions thereof"). In some exemplary embodiments, the source webpage, which may be rendered in the in-app browser or application prior to obtaining the second webpage, may comprise a link to the second webpage, and an initial webpage request from which the traffic is referred may be configured to render the second webpage or an initial portion thereof. In some exemplary embodiments, the initial webpage request may be generated by the browser or application rendering the source webpage in response to a user selection of the link. In other cases, instead of following a link, the first initial webpage request for the second webpage may be generated in response to any other user action or lack thereof with respect to the source webpage, automatically in response to a completion of a period of time, based on heuristics, or the like.

In some exemplary embodiments, the supplement webpage requests may be generated by the rendering browser that renders the second webpage. In some exemplary embodiments, the supplement webpage requests may be generated upon executing code at the user device, for example executing JavaScript (JS) code or any other type of code that is embedded in the second webpage or the browser that may cause a webpage request to be generated. In some cases, JS code may be obtained from or associated with a third-party server or domain, which may be different from a content server providing the second webpage. For example, a user may follow a link to an article that is provided by a content server associated with the article. The article may be provided with embedded JS code of a different affiliated server, e.g., an advertising server. Upon rendering or loading the article at the user device, the JS code may be executed, and one or more supplement webpage requests may be generated and provided to the advertising server, thereby adding to the rendered article one or more advertisements.

In some exemplary embodiments, a webpage request may be identified as lacking valid referral information, e.g., by one or more servers handling the request. In some exemplary embodiments, such an identification may be based on a lack of a Referrer request header in an HTTP header of the webpage request, or based on an estimation that an existing Referrer request header of an HTTP header of the webpage request is invalid, inaccurate, manipulated, or the like. In some exemplary embodiments, an existing Referrer request header may be determined to be invalid due to the Referrer request header comprising a value that cannot be used to determine a referral source of the webpage request, due to a wrongfully labeled "direct referral" of the request, due to an unusable value, due to a classifier classifying the value as invalid, or the like. In other embodiments, in case the webpage request is identified as comprising valid referral information, a value of the Referrer request header may be utilized to determine a referral source of the request.

In some exemplary embodiments, in case a webpage request obtained at a server is identified as lacking valid referral information, artificial referral information (also referred to as "fictitious referrer") of the webpage request may be determined. In some exemplary embodiments, the artificial referral information may be generated to identify a distinguished source of referral, from which the webpage requested originates. In some exemplary embodiments, the artificial referral information may indicate that a referral source of the webpage request is associated with a source webpage from which the traffic was referred, e.g., that is rendered prior to rendering the requested webpage, with an application from which the traffic was referred, or the like. In some exemplary embodiments, artificial referral information may distinguish different types of untraceable traffic as originating from a different platform, application, website, webpage, portion of a webpage, or the like.

In some exemplary embodiments, the artificial referral information may be utilized to modify metadata associated with the webpage request, to generate an updated request based thereon, e.g., at one or more handling servers handling the request, or the like. For example, a server obtaining the webpage request may modify the request to include the artificial referral information, and forward the modified request to the destination server. As another example, a server obtaining the webpage request may determine the artificial referral information and utilize it for internal calculations, processes, or the like, e.g., in order to modify a bidding value of advertisements to the second webpage based on the artificial referral information, or for any other analysis or use.

In some exemplary embodiments, the artificial referral information may be determined based on alternative fields of the webpage request besides the Referrer request header, such as the user-agent field. In some exemplary embodiments, HTTP Headers may comprise, besides the Referrer request header, a user-agent field. In some exemplary embodiments, the user-agent field may comprise a user-agent request header of an HTTP packet. In some exemplary embodiments, the user-agent request header may include a characteristic string that lets servers and network peers identify the application, operating system, vendor, and/or version of the requesting user-agent.

In some exemplary embodiments, determining the artificial referral information may comprise utilizing a library, e.g., at least one software library, database, dictionary, or the like, to convert the user-agent field to referral information. In some exemplary embodiments, using a library, the user-agent field may be converted to conversion information indicating the referral source. In some exemplary embodiments, information relating to a source of the request may be determined based on data associated with the user-agent. For example, based on a user-agent of the visitor, it may be inferred that a link is being visited from a WebView, and therefore is associated to an application hosting the WebView. In other cases, any other portion, header or field of the webpage request may be utilized to determine the artificial referral information. In some cases, converted results may be normalized by a normalization layer, or may be left untouched.

In some exemplary embodiments, determining the artificial referral information may comprise utilizing supplementary tracking information, such as an identifier of a referring page that may be provided by the referring page, the referring platform, the referring application, the referring in-app browser, or the like. In some exemplary embodiments, an identifier identifying a referring source may be provided and may be utilized to generate corresponding artificial referral information. In some exemplary embodiments, determining the artificial referral information may comprise tracking user actions and determining a referral source that has a probability of being the referring page based on the user actions.

In some exemplary embodiments, determining the artificial referral information may comprise tracking a list of links to resources, sources of the links, or the like, and estimating the referral source to be a source hosting a link, e.g., hosting the most popular link. For example, in case a certain link to a target webpage was presented to users from a certain geographic location when visiting a certain source in a certain context (e.g., a time context, a geographic location, and the like), then visits in such context to the second webpage may be estimated to have originated from that certain source.

In some exemplary embodiments, determining the artificial referral information may comprise utilizing one or more classifiers to classify traffic to different referral sources, using statistical learning methods, data-derived methods, supervised learning, unsupervised learning, neural network classifiers, and the like. In some exemplary embodiments, a result of a classifier may be utilized in case a confidence score of the result complies with a confidence threshold. In some exemplary embodiments, at least some referral information of HTTP requests may be retained in a database, a repository, a cloud database, a file database, or the like. In some exemplary embodiments, the database may retain artificial referral information that was previously determined, untouched referral information obtained from traceable traffic, manually labeled metadata, open-source data, or the like. In some exemplary embodiments, the database may be utilized as at least a portion of a dataset for one or more ad hoc classifiers. In some exemplary embodiments, the database may be used for alternative purposes such as for determining heuristics, classification rules, or the like, which may be used to determine the artificial referral information. In some exemplary embodiments, determining the artificial referral information may be performed in any other way, using any other information or technique.

In some exemplary embodiments, based on the artificial referral information, the server may modify the HTTP request, internal metadata associated with it, generate independent packets regarding the determined artificial referral information, or the like. In some exemplary embodiments, in case the HTTP request lacks a Referrer request header field, a new Referrer request header field may be generated to comprise the determined artificial referral information. In some exemplary embodiments, in case the HTTP request comprises a Referrer request header field with invalid data, the Referrer request header field may be modified to comprise the determined artificial referral information. In other cases, the determined artificial referral information may be added to any other existing or new field of the HTTP request. In some exemplary embodiments, a modified webpage request may be generated, e.g., by a server handling or obtaining the original request, to include the artificial referral information. Thereby, the original request may be replaced with the modified webpage request that may comprise the determined referral information. In some exemplary embodiments, the modified webpage request may be used for segmentation, altering design and functionality of the webpage displays, or the like, e.g., by any handling server.

Alternatively, the HTTP request may not be touched, and the artificial referral information may be determined for internal or indirect use of one or more servers. In some exemplary embodiments, instead of generating a new Referrer request header field, the HTTP request may not be modified, and the determined artificial referral information may be retained by the server, in a database, or the like, and used for a plurality of purposes such as for analytics, as a machine learning dataset used for training a classifier, or the like.

In some exemplary embodiments, based on the referral source of the webpage request, one or more functionalities, designs, or the like, may be altered. For example, a manner of serving the second webpage to the user device may be determined based thereon. In some exemplary embodiments, based on the referral source of the webpage request, a displayed Graphical User Interface (GUI) may be modified, e.g., by modifying a content thereof, modifying a design thereof, modifying a look-and-feel thereof, modifying a ratio of sponsored content versus organic content, modifying a content or a design of an inserted intermediate content page, or the like.

One technical effect of the disclosed subject matter is enabling real-time or offline segmentation of traffic that originally lacked valid referral information, e.g., when exiting the user device. In some cases, enhanced segmentation may enable to associate traffic to an exact or approximated origin or source such as a source application, browser, portion thereof, combination thereof, or the like. In some exemplary embodiments, segmented traffic may be utilized to assist publishers in making informed decisions according to the distribution of the users, sessions, page views, and the like, for adapting the content to the traffic source such as in cases of caching, for improving a User Experience (UX) such as in cases that adapt the UX to the traffic source, or the like.

In some exemplary embodiments, a fictitious or artificial referrer, e.g., determined by a server, or an identifier generated based thereon, may be utilized for performing additional or improved analytics, improved optimizations of content serving, content caching, allocation of content or advertisements, reduced usage of computing, memory or bandwidth resources (e.g., which may be used for analytics or content serving), or the like. For example, caching of content or advertisements as a function of the traffic origin or referrer may be infeasible or inaccurate without access to referrer information. As another example, enabling real-time bidding as a function of the traffic origin or referrer is infeasible without access to referrer information.

Another technical effect of the disclosed subject matter is to solve at least in part the dark social problem, which is a known problem in the field of analytics, e.g., by identifying referral sources using the disclosed subject matter. In some exemplary embodiments, solving the dark social problem enables to perform informed analytics instead of leaving an estimated 30-80 percent of the traffic's referral information unknown.

Yet another technical effect of the disclosed subject matter is to provide an altered functionality, UX, or the like, based on the identification of the traffic referral source. As an example, personalization of digital content which may be implemented by matching a design of requested content to a design of a referral source, may not be possible for untraceable traffic. As another example, when a user presses a "back" button to return to the previous location, the functionality may be altered so that instead of the normal behavior, e.g., returning to the previous referring page, a different behavior may be provided in accordance with the referral source. In some exemplary embodiments, instead of returning to the referring page, the user may be transferred to a new intermediate page, or the existing page may be dynamically modified, to provide another chance for the current publisher to offer their content to the user in that new page before she bounces back to the referring page or application. As an example, if the user session in a certain publisher has originated from clicking on a link to follow the link to an article page by that publisher within the FACEBOOK™ application, and the user may be accustomed to the feed UX of such application, an intermediate feed may be provided with similar UX of sponsored and organic content of the certain publisher. Additionally or alternatively, an intermediate page with content of that certain publisher may be presented to the user in a look and feel and UX that is similar to the publisher's UX. If the user persists and presses "back" again, the user may be returned to the application itself.

In some exemplary embodiments, any other types of functionalities of a website may be altered according to the users' referral information. As an example, users that are referred to a website from FACEBOOK™ may be provided with a "read more" functionality, in which the beginning of the article is displayed, and the remainder is hidden. In order to read the remainder of the article, a "read more" button needs to be pressed. On the other hand, users that are referred to the website from a different source may not be provided with such functionality and the entire article may be shown when the page is loaded. As another example, a composition of a feed may be modified according to the referring source. For example, users referred to by FACEBOOK™ may be provided with more sponsored cards and less organic cards in their feed compared to other users, e.g., based on a known ratio between exploration and exploitation for each type of user. As another example, a "back to feed" or "explore more" GUI control may modify its functionality according to a referrer source of each user. For example, users referred to by FACEBOOK™ that press on the "explore more" control may be provided with an intermediate feed with a UX matching the FACEBOOK™ UX, while users referred to by GOOGLE™ may not be provided at all with the intermediate feed upon pressing on the "explore more" control.

Yet another technical effect of the disclosed subject matter is to perform informed targeting of users based on their determined session referrer. For example, users being referred to a webpage from FACEBOOK™ application may be provided with a FACEBOOK™ UX, while users that are referred to the same webpage from GOOGLE™ may be provided with a GOOGLE™ UX.

Yet another technical effect of the disclosed subject matter is to enhance an accuracy of predictions regarding user behavior such as a chance that a user will subscribe, convert, engage with content, "bounce" off the page, or the like.

Yet another technical effect of the disclosed subject matter is to utilize the information to improve the performance of machine learning models with regard to filling in a void of referral information. In some exemplary embodiments, determining more accurate and comprehensive referral information may be used to enlarge and enhance datasets, which in turn may enhance machine learning models that are trained on digital traffic for a plurality of purposes such as for predicting user behavior in certain scenarios. In some exemplary embodiments, enlarging and enhancing referral datasets may also be used to better classify content as dark social, identify a source of untraceable traffic, reducing an amount of supplement information or resources, or the like.

The disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Referring now to FIG. 1 showing a flowchart diagram of a method, in accordance with some exemplary embodiments of the disclosed subject matter.

On Step 100, a webpage request requesting a resource such as webpage may be obtained, e.g., at a server. In some exemplary embodiments, the webpage request may be generated at an in-app browser of an application of a user device, at an application, in a private messaging medium, in a PDF file, or the like. In some exemplary embodiments, the webpage request may be initiated at a source webpage, and upon obtaining one or more portions of the webpage, the webpage may be rendered in the in-app browser, in the application, or the like. In some exemplary embodiments, one or more supplement webpage requests may be generated, e.g., by the requested webpage, by the source webpage, by the rendering browser or application, or the like, to obtain supplement portions of the webpage. In some exemplary embodiments, the webpage request may comprise one or more headers or fields such as a user-agent field.

In some exemplary embodiments, the webpage request may be obtained by a server retaining webpage data, to a handling or forwarding server that is participating in the process of providing webpages to the client, or the like. Additionally, or alternatively, the webpage request may be intercepted or otherwise obtained by an on-client agent, such as implemented by a browser extension, daemon process, or the like.

On Step 110, the webpage request may be identified as not including valid referral information. In some exemplary embodiments, such a determination may be based on the Referrer request header being omitted from the webpage request. In some exemplary embodiments, a Referrer request header may be present but may be determined to be inaccurate, e.g., based on heuristics, a classifier, or the like. In some exemplary embodiments, a link shared in dark social may lack referral tags or other metadata related to the origin or source, so when the recipient follows such link, her visit will be labeled as 'direct' traffic. Such determination may be erroneous, as the recipient was referred to the link and did not directly input it. Additionally or alternatively, traffic may comprise non-accurate referral information, such as noisy information, partial information, or the like, that can be misinterpreted as direct traffic.

In some exemplary embodiments, a classifier may be trained to determine whether a Referrer request header that is present in the webpage request is valid, e.g., based on a history of past classifications, on behavioral patterns, or the like. In some exemplary embodiments, the classifier may be trained to identify when an indicated direct referral is corrupt, e.g., based on a length of an address of the second webpage, based on tracked user activity prior to generating the webpage request, or the like. In some exemplary embodiments, the classifier may determine whether it is probable that the referring was direct based on compliance of a confidence score of a classification result with a confidence threshold, based on a determined compliance with a probability threshold, or the like. In some cases, it may be possible to employ heuristics, rules and the like to identify referrals that appear as direct traffic but are estimated to be dark social referrals or otherwise untraceable referrals. As an example, it may be unlikely that the visitor would type a link address manually into her browser, if the link is long.

In some exemplary embodiments, any user session (e.g., including all the visits and page views it comprises) that did not begin at a homepage of a publisher, and lacks information about what led the user to the initial visit in that session, may be classified as not including valid referral information. As an example, a user session in a news-related publisher site that seems to have started in a certain article page that is not the homepage, with an empty HTTP referrer header, or other parameters in the request that indicate the origin, may be considered as not having valid referral information.

On Step 120, artificial referral information of the webpage request may be determined based on the webpage request. In some exemplary embodiments, the artificial referral information may be determined based on one or more portions of the webpage request excluding the invalid referral information, one or more portions including the invalid referral information, or the like. In some exemplary embodiments, the artificial referral information may be generated to indicate a referral source of the webpage request. In some exemplary embodiments, different types of untraceable traffic may be distinguished as originating from a specific source or origin, e.g., a different application, website, webpage, portion of a webpage, or the like. In some exemplary embodiments, the artificial referral information may be generated to identify the distinguished referral source of the webpage request, e.g., an in-app browser of an application, an application, a previous webpage, or the like. In some exemplary embodiments, the artificial referral information may indicate that the referral source is associated with the in-app browser of the application, with the application, with the referring webpage, user device information, or the like.

In some exemplary embodiments, the artificial referral information may be determined based on a field or portion of the webpage request, e.g., the user-agent field, which may be converted to referral information. In some exemplary embodiments, the artificial referral information may be determined based on an identifier of the referral source which may be obtained from the referral source. In some exemplary embodiments, the artificial referral information may be determined based on monitoring user activities of a user of a user device sending the webpage request, and estimating a probable referral source based on the user activities. In some exemplary embodiments, the artificial referral information may be determined based on monitoring a list of active sources of the target webpage, and estimating a probable referral source based on the list. In some exemplary embodiments, the artificial referral information may be determined based on a trained classifier that may be trained to correlate between at least one field of the webpage request and the referral source.

In some exemplary embodiments, determining artificial referral information for a webpage request may be generally described according to an algorithm, which may be described in a simplified non-binding manner, e.g., as follows:

if a valid Referrer request header is identified in the webpage request, use a value of the Referrer request header to determine a referring source of the webpage request.

If no valid Referrer request header is identified, determine artificial referral information by performing at least one of Steps a-f, as follows:
   a. convert a user-agent field to the referring source using a converting library or service, and normalize the result (e.g., to obtain uniformity).
   b. use a trained classifier (e.g., a machine learning classifier) that is trained to classify user-agent fields to different referring sources, to classify the user-agent field of the request.
   c. perform Step a. or b. with respect to alternative portions or parameters of the HTTP request in addition to or excluding the user-agent field, such as one or more UTM parameters, or based on other data or context related to the specific session.
   d. in case an identifier is provided by the referral source, and it is determined to be valid, use the identifier to identify the referral source.
   e. track the user's activity by gathering information about the user from website or application owners, and based on the user's activity determine an estimated referral source.
   f. monitor links located at different sources to determine a most likely source.

In some exemplary embodiments, in accordance with Step a. of the algorithm described above, artificial referral information of the webpage request may be determined by converting user-agent information to referral information. In some exemplary embodiments, besides the Referrer request header, which may not always be present, HTTP Headers may comprise fields such as a user-agent field, UTM parameters, or the like.

In some exemplary embodiments, a user-agent field may be utilized to act on behalf of the user, as a client in a network protocol used in communications within a client-server distributed computing system. The user-agent field may be configured to retrieve, render and facilitate end user interaction with web content. In some exemplary embodiments, the HTTP packet may comprise user-agent information (e.g., in textual form), that may be used to encode information related to the browser that the user uses, its software vendor, a software version, an operating system, or the like. In some exemplary embodiments, the user-agent request header may include a characteristic string that lets servers and network peers identify the application, operating system, vendor, and/or version of the requesting user-agent. In some exemplary embodiments, each bit of the user-agent field may indicate a particular attribute of the requesting system. In some exemplary embodiments, the client software originating the request may be identified using user-agent information residing in the HTTP header. In some exemplary embodiments, the user-agent field may be utilized to infer that the user followed a WebView link and not a direct link, to identify a specific referring page, or the like.

In some exemplary embodiments, based on the user-agent information, it may be possible to determine which mobile application is used to view the website, such as in case that an in-app browser is utilized, or in any other case. In some exemplary embodiments, different web browsers may use different formats for writing a user-agent string, and many web browsers may cram a large amount of information into their user-agent strings. It may be noted that the exact format and content of a user-agent string may depend on the exact browser software, the in-app browser's version, platform, operating system, or the like, thus decoding the user-agents and inferring such information may be a relatively difficult task.

In some exemplary embodiments, libraries or databases that comprise information relating to different user-agents, may be utilized for converting such fields to referral information or to other metadata that may be used to determined referral information. In some exemplary embodiments, the libraries or databases may comprise data relating to the user-agent string. In some cases, a utilized library or database may be manually curated and maintained. In some exemplary embodiments, the utilized libraries may comprise third party services, libraries or databases, obtained open-source libraries, generated libraries that are generated by gathering determined referral sources and associated user-agent fields, or the like.

In some exemplary embodiments, the libraries may be utilized by applying certain heuristics in textual string analysis (e.g. checking whether a certain substring appears in the user-agent string, after certain string manipulations), thereby obtaining for the user-agent field an associated library entry with conversion referral information. As an example, a database of micro-segments of user-agents may be utilized to determine conversion referral information related to the traffic of a certain user-agent based on referral information of other user-agents in the segment.

In some cases, in addition to obtaining the conversion referral information, the conversion referral information may be translated, normalized, or processed on order to determine the artificial referral information. In some exemplary embodiments, a normalization layer or software may be used to normalize the conversion information resulting from converting the user-agent field, and provide unified referral source representation (also referred to as "unified referral metadata" or "referrer metadata"), e.g., unifying different platforms, operating systems, contexts, or the like, originating from the same referral source. This may be desired since in some cases the conversion information may identify differently user-agents that are utilized by different mobile applications. In some exemplary embodiments, it may be desired that a unified representation of a referral source such as a certain website or portion thereof will relate to the source itself and will not create different representations for requests from devices having different operating systems, platforms, or the like. In some exemplary embodiments, normalizing the conversion information may be performed by automatically adding, merging or modifying conversion referral information, e.g., by a server, such as for enabling analytics based thereon. In some cases, the unified referrer metadata may identify the application or source webpage from which the user was referred, regardless of a context thereof. In some exemplary embodiments, in some cases, the unified referrer metadata may comprise more than one type of information, to accommodate a variety of desired usages. For example, the unified referrer metadata may comprise a plurality of identifiers, source representations with varying granularity, and other information, encoded in a list of textual strings, in a dictionary of textual strings, in a hierarchical data structure, or the like. In some exemplary embodiments, the artificial referral information may be generated to include the unified referrer metadata, portions thereof, or the like. In some cases, a normalization layer may be applied to any of Steps b-f as well.

As an example, when a user of an iOS-based device follows a link to an article within the FACEBOOK™ application, the article may be viewed on a WebView of FACEBOOK™ in-app browser, and the user-agent string may be converted by one or more libraries to the string "Facebook iOS". However, in case an Android-based device follows the same link from the same source, the user-agent may be converted by the libraries to the string "Facebook Android". According to this example, the normalization layer may determine a unified representation for both "Facebook Android" and "Facebook iOS", such as "app.facebook.com", which includes all types of devices that were referred to a webpage from the FACEBOOK™ application. According to this example, "app.facebook.com", representing the FACEBOOK™ application, may be a fictitious or artificial referrer, that, in some cases, may not resemble referral data that is used by the FACEBOOK™ application itself when generating traceable traffic.

Additionally or alternatively, the referrer metadata may identify a source of the webpage request more generally, e.g., irrespective of the use of an application. As an example, the referral metadata may be www.facebook.com, representing FACEBOOK™, irrespective of whether the end user used the FACEBOOK™ application or the FACEBOOK™ website.

Additionally or alternatively, the referrer metadata may identify a source of the webpage request in a more specific or granular manner, such as identifying a certain category within the application, a specific page or location within the application, a source from which the user was referred within a page, a content category or usage segment from which the user was referred irrespective of a specific application, or the like. As an example, an artificial referral may be "app.facebook.com/watch", representing origination of the traffic in the "Watch" section within the Facebook™ application, or "fb.com#post123#comment456" representing a specific location within a Facebook™ application or website, or "watching videos", "reading emails", "sports-related content" representing certain content categories, usage types, content types or segments from which the traffic was referred and irrespectively of the specific application, or the like.

In some exemplary embodiments, in accordance with Step b., a classifier may be trained to determine the artificial referral information. In some exemplary embodiments, the classifier may be trained to correlate between one or more fields of each webpage request and a corresponding referral source. In some exemplary embodiments, a result of the classifier may be used in case a confidence score of the result complies with a confidence threshold, or in any other case. In some exemplary embodiments, one or more classifiers may be trained to classify or cluster traffic to different referral sources, correlate between user-agents and behaviors and user-activities of users, e.g., before or after sending the HTTP request, or the like. For example, certain behaviors of users having a certain user-agent may be correlated with a certain application, e.g., FACEBOOK™ application, as the referral source. In some exemplary embodiments, the artificial referral information may be determined based on the correlated application that is identified for the user-agent field. In some cases, different behaviors may be identified for a same user when visiting different websites.

In some cases, as libraries, databases, or dictionaries may not always be robust to changes in formats, technologies, or the like, utilizing the classifier may overcome such deficiencies. In some exemplary embodiments, instead of using libraries which may require manual labor and may be prone to errors, inaccuracies, missing values, and being not up-to-date with changes in format and content, utilizing classifiers may provide an automatic robust result that may be used to extract information from HTTP requests without requiring manual updates.

In some exemplary embodiments, at least some referral information of webpage requests may be retained in a database, a repository, a cloud database, a file database, or the like. In some exemplary embodiments, the database may retain artificial referral information that was previously determined, original non-artificial referral information obtained from traceable traffic, open-source referral information, or the like. In some exemplary embodiments, the database may be utilized as at least a portion of a dataset for one or more ad hoc classifiers. In some exemplary embodiments, the database may be used for alternative purposes such as for determining heuristics, classification rules, or the like. In some exemplary embodiments, in some cases, the database may partially or fully correlate with the libraries described in Step a.

In some exemplary embodiments, a classifier may be trained to determine artificial referral information of untraceable traffic using the database as a training dataset, e.g., based on referral information determined or obtained for similar user traffic indicated by the database. In some exemplary embodiments, the similar user traffic may be identified or determined as such based on a similarity criteria, e.g., a number of identical attributes, corresponding behavioral patterns after obtaining the requested content, or the like. In some exemplary embodiments, the classifier may be trained to cluster user traffic to clusters of referral types. In some exemplary embodiments, the referral types may comprise a direct referral type, an indirect referral type via a certain application or webpage, an indirect referral type via a different application or webpage, or the like.

In some exemplary embodiments, machine learning classifiers, e.g., unsupervised or supervised classifiers, may be trained to determine artificial referral information, e.g., using the database as a dataset. In some exemplary embodiments, a supervised machine learning classifier may be trained to determine artificial referral information of webpage requests based on values of user-agent fields of the webpage requests, based on values of other fields of the webpage requests, a combination thereof, or based on any other characterization of an HTTP request such as absent strings, existing strings, values of different fields or headers of the webpage requests, or the like. In some exemplary embodiments, a supervised machine learning classifier may be trained to determine artificial referral information of webpage requests based on session data associated with the webpage requests.

In some exemplary embodiments, machine learning techniques may be applied to track the behavior of the users associated with certain types of user-agents, origins or sources, and determine whether such users behave like users that originated from known referrers (such as FACEBOOK™ referrers), origins or sources, whether such users behave like users originated from a real "direct link", or the like. Machine learning models may be trained to perform behavioral analysis of users or sessions of different user-agents, to associate such behaviors with a source of the traffic. Additionally or alternatively, traffic from different user-agents that was classified as dark social of certain type, may be clustered into different segments based on the user behavior. A probability or likelihood that the traffic has originated from sources or origins may be estimated based on user-agent data, additional request metadata, user data, behavioral data, other data related to the usage or content, real-time or historical, a combination thereof, or the like. Different user-agent strings that belong to the same segment (e.g., associated with a similar behavior), may be deduced to be originated from the same source. In some cases, additional investigation or learning may be performed to determine the source of such user-agent traffic, such as manually, by human expert, or the like. In some exemplary embodiments, determining the artificial referral information may comprise utilizing a result of a classifier in case a confidence score of the result complies with a confidence threshold.

In some exemplary embodiments, in accordance with Step c., one or both of Step a. and Step b. may be performed with respect to alternative portions or parameters of the HTTP request excluding the user-agent field, such as UTM parameters of the HTTP request, or any other header or field of the HTTP request. In some exemplary embodiments, any of the above steps may be performed with respect to additional metadata associated with the request such as a utm_source parameter of the UTM parameters. In some exemplary embodiments, the alternative portions of the HTTP request may be used in similar manners as disclosed herein, for example, in relation to the user-agent information.

In some exemplary embodiments, the alternative portions of the HTTP request may comprise request parameters such as GET request parameters (e.g., a "utm_Referrer" GET request parameter), client information describing a current client which may comprise an identifier of a user of the user device, an identifier of the user device, a "cookie" identifier, or the like. In some exemplary embodiments, the alternative portions of the HTTP request may comprise referrer information, e.g., invalid referrer information, such as the HTTP referrer Header, deduced information therefrom, or the like. In some exemplary embodiments, the alternative portions of the HTTP request may comprise a context of the HTTP request such as history information indicating a history of the user device which may be obtained, e.g., from internal servers, external servers, private devices, or the like. In some exemplary embodiments, the alternative portions of the HTTP request may comprise page information comprising data on the specific page such as statistics regarding similar pages, an origin thereof, or the like.

As an example, a user pressing on a link from a newsletter email may cause the HTTP request to comprise one or more GET parameters such as utm_source=email or utm_source=newsletter. In some exemplary embodiments, such parameters may be used to determine the artificial referral information by utilizing one or more libraries in accordance with Step a., by training a classifier to identify referral information based on UTM parameters or other parameters, e.g., in similar manners as disclosed in Step b., or the like.

In some exemplary embodiments, in accordance with Step d., in case an identifier of a referral source is provided by the referral source, the identifier may be validated and used to identify the referral source. For example, a website such as TABOOLA NEWS™ may add custom tracking code to a URL of a browser to "color" the website traffic as belonging to TABOOLA NEWS™, so it may be traced. In some exemplary embodiments, the artificial referral information may be determined to include the referral source indicated by the identifier, e.g., based on the tracking code or any other tracing technology.

In some exemplary embodiments, in accordance with Step e., information about usage of applications or websites by the user may be gathered or monitored by the application or website owners, and may be used to track the user's activities prior to generating the HTTP request, subsequent to generating the HTTP request, a combination thereof, or the like. Based on the user's activity, an estimated referral source may be determined. For example, if the user's activities indicate that she performed a click in an application and right after that she arrived at an article webpage by a direct referral, it may be assumed that the direct referral actually originated from the application.

In some exemplary embodiments, in accordance with Step f., links from different sources may be continuously monitored, tracked, or the like. In some exemplary embodiments, the monitored links may lead to different resources, content, webpages, or the like. For example, trending links that are more likely to appear at each moment in different sources may be tracked in real time. In some exemplary embodiments, upon obtaining an HTTP request for a target webpage that lacks valid referral information, the source of the HTTP request may be estimated based on usage statistics gathered from different links leading to the target webpage, e.g., from different webpages, applications, or the like. As an example, a link, or a source hosting a link, that is most widely used to consume the target webpage, may be considered as the most likely source of the HTTP request, for example, based on a Maximum Likelihood estimation, or any other statistical methods. In some exemplary embodiments, the artificial referral information may be determined to include the most likely source of the HTTP request.

On Step 130, the artificial referral information may be utilized, e.g., in one or more application or usages. In some exemplary embodiments, the HTTP request or metadata associated with it may be modified to comprise the artificial referral information, e.g., as determined on Step 120. In some exemplary embodiments, the modified HTTP request may be generated and utilized instead of the original HTTP request that was obtained on Step 100. Additionally or alternatively, the artificial referral information may be utilized for alternative uses, such as for modifying metadata or records of HTTP requests, for enhancing analytics services and other monitoring services, or the like. In some exemplary embodiments, analytics services may analyze the referral source to differentiate between traffic, such as based on the traffic originating from different sources.

Figure 2:
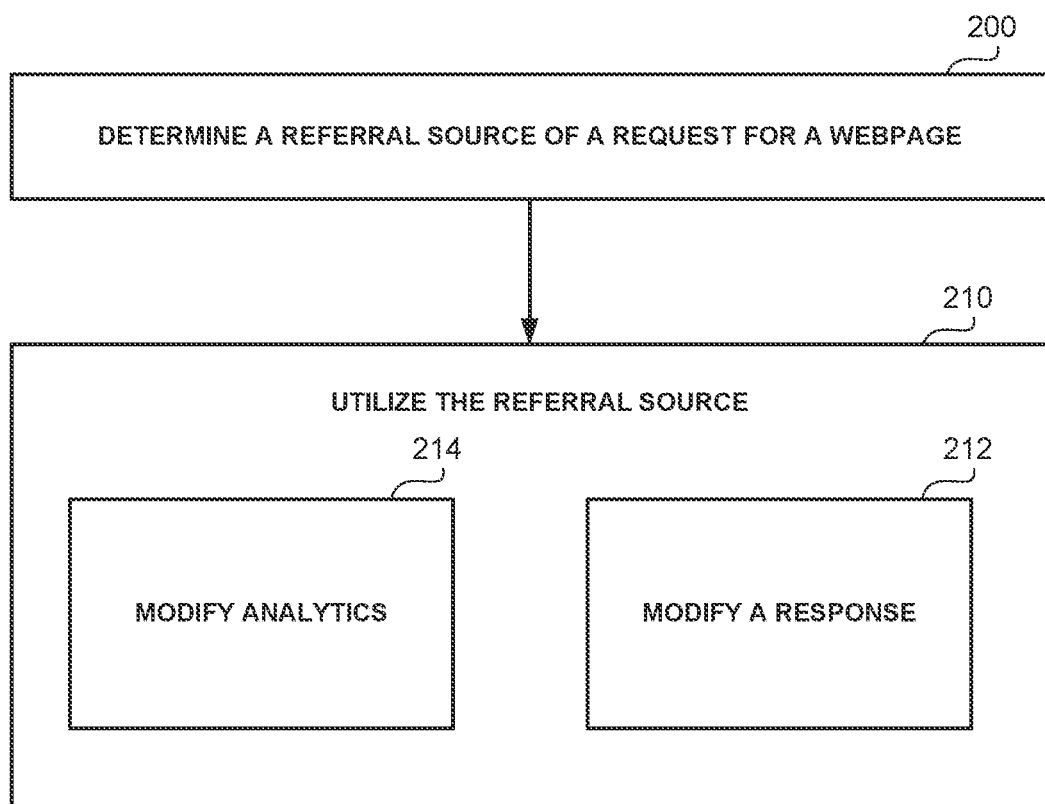
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, a referral source of an HTTP request, e.g., a webpage request, may be determined, e.g., at a server. In some exemplary embodiments, the request may be configured to request a second webpage, portions thereof, to provide data, or the like, and may be initiated by an in-app browser of an application of a user device, or from any other referral source, platform, application, or the like.

On Step 210, the determined referral source may be utilized for one or more operations, calculations, processes, or the like. In some exemplary embodiments, based on a referral source of the webpage request, a functionality of the server may be modified, e.g., by modifying a UX of the served webpage, modifying a control functionality of the served webpage, modifying a GUI of the second webpage, modifying a look-and-feel of the second webpage, modifying a ratio of sponsored content versus organic content, modifying a content or a design of the second webpage, modifying a functionality of the second webpage, or the like. In some exemplary embodiments, based on a referral source of the webpage request, one or more internal processes or calculations associated with the server may be modified.

In some exemplary embodiments, the determined referral source may be utilized by a server determining the referral source, or by a server obtaining a modified request comprising the determined referral source.

On Step 212, based on a referral source of the webpage request, a response of the server to the request may be modified, e.g., based on the artificial referral information. In some exemplary embodiments, the response to the webpage request may include serving the webpage to the user device in one or more processes, methods, schemes, or the like. In some exemplary embodiments, a functionality or content provided by the server in response to the webpage request may be modified or altered in a plurality of manners.

As an example, when a user presses a GUI control such as a "back" button at a webpage that is rendered in the in-app browser, e.g., in order to return to the previous webpage, instead of the normal browser behavior of returning to the previous location, an altered behavior may be provided. In some exemplary embodiments, in response to obtaining a return command instructing to return from the webpage to the source webpage, e.g., a user command, the user may be transferred to a new intermediate content page, or the existing page may be dynamically modified, to provide another chance for the current publisher to offer their content to the user in that new page before she bounces back to the referring page. As an example, if the user session in a certain publisher has originated from clicking on a link to follow the link to an article page by that publisher within the FACE-BOOK™ application, and the user may be accustomed to the feed UX of such application, a feed with similar UX of sponsored or organic content of that certain publisher may be presented thereto in the intermediate content page. Additionally or alternatively, a page with content of that certain publisher may be presented to the user in a look and feel and UX that is similar to the publisher's UX. If the user persists and presses "back" button again, the user may be returned to the previous webpage, to the application itself, or the like. In some exemplary embodiments, the intermediate content page may be served to the user upon the user performing any other actions, such as selecting a "back to feed" control, or any other GUI control that is configured to navigate between content windows or webpages. In such cases, the user may be served with new content comprising a feed that is designed to match a design of a current webpage, a previous webpage, a target webpage, or the like. In some exemplary embodiments, the intermediate content page may be characterized in having an organic UX that matches the UX of the referring page, the UX of the second webpage, the UX of the target page, or the like.

In some exemplary embodiments, the intermediate content page may be displayed by inserting the intermediate content into a browsing history of the user device. Specifically, the intermediate content page may be placed in the browsing history in a location that is prior to a current webpage and adjacently thereto, e.g., after the previous or source webpage, thereby causing the intermediate content page to be displayed in response to a return command. Alternatively, the intermediate content page may be inserted in any other location of the browsing history, such as two locations prior to the current webpage. Additionally or alternatively, the intermediate content page may be displayed based on inserted code or hooks, which may be inserted to the second webpage, the browser rendering the webpage, or the like. For example, pressing a "back" button may create a browser event, which may be caught by the webpage code within the browser. In such cases, the webpage code may display the intermediate content page in response to such event, and propagate the event back to the browser in response to a second return command. In some exemplary embodiments, the source webpage may be displayed to the user upon receiving the second return command, e.g., a subsequent user command. In other cases, any other implementation may be used for inserting an intermediate page that is determined based on the referral information.

In some exemplary embodiments, a decision as to whether to show the intermediate content page upon obtaining return command may depend on parameters such as a deduced origin of the traffic, the user data, an identified user profile, other traffic data, or the like. For example, for user sessions that are deduced to have originated from a certain application, when the user presses "back" to return to a previous location or view, a decision as to whether to transfer the user to a new page, dynamically modify an existing page, return to the application itself, or the like, may be based on whether the user is classified as a "loyal" visitor of the publisher site, as a "fan" of the application, as a "casual" visitor, or the like.

In some exemplary embodiments, an alternative response to the webpage request may comprise altering a presentation mode of the requested webpage, e.g., depending on the deduced referring origin. As an example, when visiting an article from FACEBOOK™, the article may be displayed in a short version along with a "Read More" GUI button that provides a full version of the article, but when visiting the same article from a different referral source, e.g., from direct referral, the article may be displayed in a full version without the "Read More" button.

In some exemplary embodiments, the content of the requested webpage may be modified, adapted or personalized based on the referrer information, deductions therefrom, or the like. As an example, the content of the requested webpage that was deduced to have been visited from a FACEBOOK™ application, may differ from the content of the same requested webpage when visited by direct referral. In some exemplary embodiments, the content may be personalized in accordance with the user or with a profile of the user, may comprise personalized ads, a personalized ratio of sponsored content versus organic content, articles that may interest the user, or the like. In some exemplary embodiments, the provided functionality may differ for different types of users. For example, users may be classified as "fly by" or "causal" users that are new to the website or as "loyal" users that are frequent visitors of the website. In such a case, "fly by" users may be provided with different content distribution or a different content composition from "loyal" users; for example, "fly by" users may be presented with a high percentage of sponsored content while "loyal" users may be provided with a larger percentage of organic content with less sponsored content. In other cases, any other classification of users or traffic may be utilized, and any functionality of content distribution may be altered based thereon.

In some exemplary embodiments, an alternative response to the webpage request may comprise altering a design of the requested webpage when displayed to the user device, e.g., based on the referral source. In some exemplary embodiments, the presentation of the requested webpage may be served to the user in a personalized manner. In some exemplary embodiments, a content of the requested webpage may be modified, as well as a GUI of the requested webpage, a look-and-feel of the requested webpage, a content or a design of an inserted intermediate content page, or the like. In some exemplary embodiments, the content may be presented in a different look-and-feel based on the determined fictitious referrer or the deduced sources or origins of the traffic. As an example, a look-and-feel matching the FACEBOOK™ application may be utilized if the traffic is referred to therefrom, while a different look-and-feel may be utilized when the referred application is an E-Mail client application, indicating that the link was provided to the user via a private email communication. For example, a content design of a requested webpage may be matched to a design of a referral source, e.g., the source webpage, to thereby provide a more unified and harmonic design.

In some exemplary embodiments, the user experience, content, presentation, or the like, of the second webpage may be altered or adapted in real-time, and may be determined based on identified or deduced origin or source of traffic, real-time or historical user data, behavioral profile or mood of the user, other traffic data, external data, real-time factors and events, or the like. For example, certain user experience or design as described above may be provided based on the deduced origin of the user traffic and in conjunction with other user data, such as an estimation of the user's likelihood to comport well in that certain user experience. In other cases, any other implementation may be used for personalizing digital content.

In some exemplary embodiments, adaptation of the second webpage may be done at the client side independently of a server, or in response to indications received from a server, lack of such indications, or the like. In some exemplary embodiments, a server may adapt its response based on the determined referrer information, deductions therefrom, or the like, e.g., in real time.

On Step 214, based on a referral source of the webpage request, one or more internal analytics, processes or calculations associated with the server may be performed, modified, or the like. In some exemplary embodiments, one or more servers may adapt actions, processes or decisions that do not necessarily affect the response, based on the determined referrer information, deductions therefrom, or the like. In some exemplary embodiments, real-time processes that perform real-time optimizations and adaptations such as real time serving of content (e.g., advertisement content), real time functionality adaption, real time user experience adaption, real time modification of internal information such as adapting real-time bids of advertisements, or the like, may be modified without affecting the server's response to the request.

For example, based on the determined referral source, a bidding value for a target webpage may be modified, but the server may handle the request regularly, e.g., without modifying the request, a response to the request, or the like. As an example, a third-party server may determine in real-time whether to place a bid for certain content or engagement therewith in response to a real-time request, a bid amount or data, or the like. As another example, an advertiser or publisher may configure a server to place a large Cost Per Click (CPC) bid for engagement with content that originated from direct traffic, and to place a lower CPC bid for engagement with content that originated from a certain referring application. In some exemplary embodiments, the server may adapt its decision, analysis, calculations, database, or bid based on the deduced source or origin associated with the request.

Figure 3:
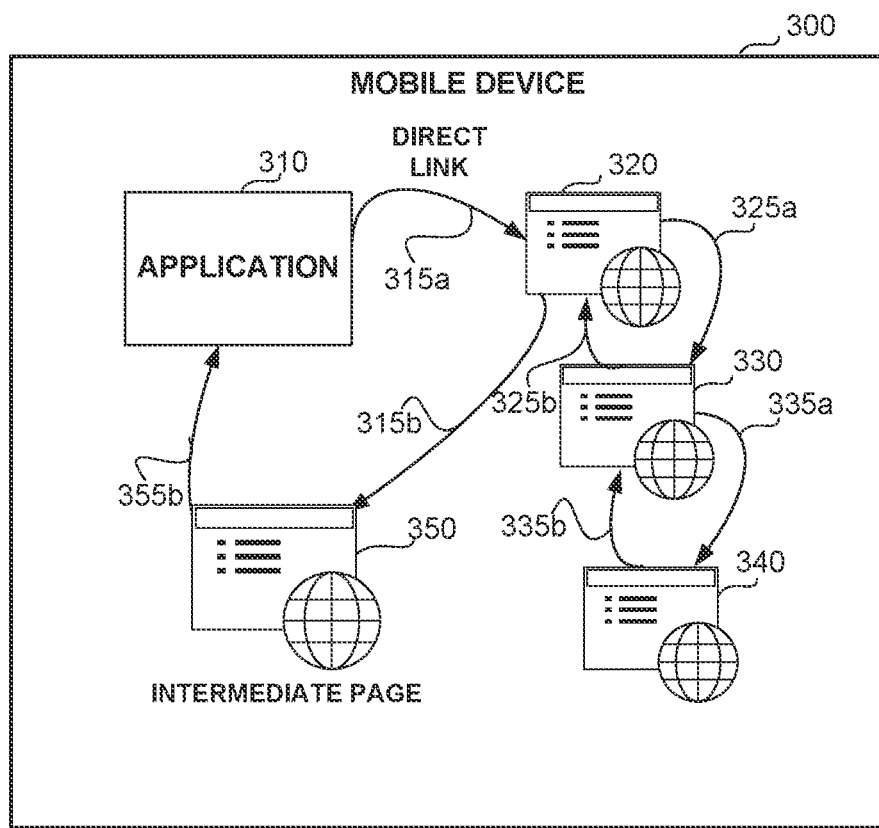
FIG. 3 shows a schematic illustration of an exemplary environment and architecture in which the disclosed subject matter may be utilized, in accordance with some exemplary embodiments of the disclosed subject matter.

Referring now to FIG. 3 showing a schematic illustration of an exemplary environment and architecture in which the disclosed subject matter may be utilized, in accordance with some exemplary embodiments of the disclosed subject matter.

In some exemplary embodiments, a user of Mobile Device 300 may visit Website 320 from Application 310 via Direct Link 315*a*. In some exemplary embodiments, a web browser of Mobile Device 300 may send an HTTP request to the web server holding Website 320 in order to obtain Website 320. Upon obtaining Website 320, the web browser of Mobile Device 300 may send a plurality of supplement HTTP requests to obtain supplement portions of Website 320.

In some exemplary embodiments, at least some of the HTTP requests initiated in response to selecting Direct Link 315a may be absent of any referral information. In some exemplary embodiments, a server serving an HTTP request to present Website 320 or portions thereof, may identify the user-agent field of the HTTP request, and may determine that that the user-agent field indicates that a referral source of the HTTP request is an in-app browser of Application 310, e.g., in accordance with Step 120 of FIG. 1. The web server may determine an artificial HTTP referrer that includes the referral source of the HTTP request. The HTTP referrer may comprise an artificial referrer, artifact referral information, or the like, that is determined and generated by the server. In some exemplary embodiments, analytics and other monitoring services may obtain the updated request metadata and analyze it, thereby being able to differentiate between different traffic, such as based on the traffic originating from different applications or sources.

In some exemplary embodiments, the user may continue browsing other webpages after visiting Website 320, such as Website 330 from Website 320 via Referred Link 325a, Website 340 from Website 330 via Referred Link 335a, or the like. In some exemplary embodiments, while using Referred Links 325a, 335a, the HTTP request packets obtained by the server may be regenerated to comprise an HTTP referrer field, e.g., including artificial referral information. Alternatively, while using Referred Links 325a or 335a, artificial referral information may be determined by a handling server for each obtained HTTP request packet, e.g., without modifying or regenerating the packet.

In some exemplary embodiments, one or more functionalities or designs of the GUI presented to the user on Mobile Device 300 may be altered based on the artificial referral information. For example, the user may provide a return command, e.g., by pressing on a "back" button, in order to command a return from Website 320 to the previously visited page, e.g., Application 310. As an example, Back 335b may indicate returning from Website 340 to Website 330 such as upon selecting a "back" control. Similarly, Back 325b may indicate returning from Website 330 to Website 320 such as upon selecting a "back" control. In some exemplary embodiments, the "back" control or any other control may be available in the Android™ OS, externally to the browser.

In some exemplary embodiments, upon browsing Website 320 and selecting a "back" control (Back 315b), the behavior of the "back" control may be modified based on identifying that Direct Link 315a originated from Application 310. In some exemplary embodiments, instead of returning to Application 310 in response to selection of Back 315b, the disclosed subject matter may override the standard behavior and provide an Intermediate Page 350 in response to Back 315b. As an example, Intermediate Page 350 may be provided to the user, e.g., by inserting an URL of Intermediate Page 350 to the browsing history, by dynamically manipulating Website 320, by using hooked code that is inserted to the browser or to Website 320 to direct the flow to Intermediate Page 350, or the like. As an example, the content, GUI, look-and-feel, or the like, may be provided in a manner that depends on the identity of Application 310, other traffic data, user data, or the like. As an example, Intermediate Page 350 may have the same look-and-feel as provided within Application 310, provide a functionality similar to the functionality provided by Application 310, or the like. It may be noted that Intermediate Page 350 may be a webpage that the user may have not visited before, in contrast to the standard behavior of the "back" button. In some exemplary embodiments, if the user persists in pressing "back", Back 355b may be implemented and the user may be returned to the originating Application 310.

Figure 4:
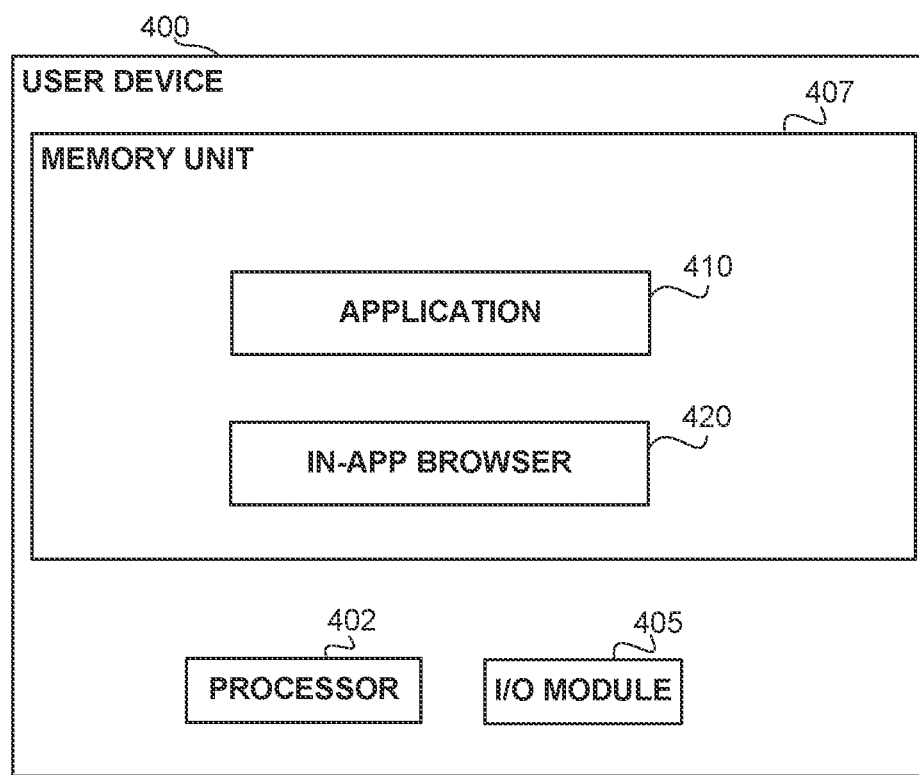
FIG. 4 shows a block diagram of an apparatus of a user device, in accordance with some exemplary embodiments of the disclosed subject matter.

Referring now to FIG. 4 showing a block diagram of an apparatus of a user device, in accordance with some exemplary embodiments of the disclosed subject matter.

In some exemplary embodiments, a User Device 400 may comprise a Processor 402. Processor 402 may be a Central Processing Unit (CPU), a microprocessor, an electronic circuit, an Integrated Circuit (IC) or the like. Processor 402 may be utilized to perform computations required by User Device 400 or any of its subcomponents. Processor 402 may be configured to execute computer-programs useful in performing the methods of FIGS. 1-2, or the like.

In some exemplary embodiments of the disclosed subject matter, an Input/Output (I/O) Module 405 may be utilized to provide an output to and receive input from a user. I/O Module 405 may be used to transmit and receive information to and from the user or any other apparatus, e.g., one or more servers, in communication therewith.

In some exemplary embodiments, User Device 400 may comprise a Memory Unit 407. Memory Unit 407 may be a short-term storage device or long-term storage device. Memory Unit 407 may be a persistent storage or volatile storage. Memory Unit 407 may be a disk drive, a Flash disk, a Random Access Memory (RAM), a memory chip, or the like. In some exemplary embodiments, Memory Unit 407 may retain program code operative to cause Processor 402 to perform acts associated with any of the subcomponents of User Device 400. In some exemplary embodiments, Memory Unit 407 may retain program code operative to cause Processor 402 to perform acts associated with any of the steps in FIGS. 1-2, or the like.

The components detailed below may be implemented as one or more sets of interrelated computer instructions, executed for example by Processor 402 or by another processor. The components may be arranged as one or more executable files, dynamic libraries, static libraries, methods, functions, services, or the like, programmed in any programming language and under any computing environment.

In some exemplary embodiments, Application 410 may comprise a native application of the user device, a web application of the user device, a hybrid application of the user device, or the like. In some exemplary embodiments, Application 410 may be utilized by a user of the user device for one or more purposes, e.g., as a social network medium, for entertainment, for news consumption, for obtaining a certain functionality, or the like.

In some exemplary embodiments, In-app Browser 420 may be operated by Application 410, and may be configured to provide browsing functionality within Application 410. In some exemplary embodiments, In-app Browser 420 may not necessarily be an independent web browser, but rather a WebView window that provides limited browsing functionality. In some exemplary embodiments, In-app Browser 420 may co-operate with one or more independent browsers, a default browser, or the like, such as with CHROME™ Custom Tabs, SAFARI™ ViewController, or the like. In some exemplary embodiments, the WebView window may be executed as a sub-process of Application 410, may be running off the user device's core browser, or the like.

In some exemplary embodiments, In-app Browser 420 may include one or more instances of WebViews to which content may be loaded, e.g., the content comprising a public URL, content from Application 410's resources, a string of HTML, or the like. In some exemplary embodiments, In-app Browser 420 may provide crude navigational controls enabling back or forward movement, access to the JavaScript environment from native code, or the like. In some exemplary embodiments, In-app Browser 420 may be configured to handle network communications of the user, e.g., via I/O Module 405.

In some exemplary embodiments, In-app Browser 420 may be configured to send out, to one or more servers, one or more HTTP requests that are configured to trigger an action at the server, receive HTTP responses from the server, process received data, or the like. In some exemplary embodiments, In-app Browser 420 may be configured to, in response to a user request, obtain form the server content that is requested by a user, e.g., a requested webpage, portions thereof, or the like, and use it to render a viewable page for the user including one or more obtained portion.

In some exemplary embodiments, In-app Browser 420 may generate an initial HTTP request upon obtaining a user instruction to change a currently rendered webpage with a target webpage, such as by a user pressing on a link of In-app Browser 420. In some exemplary embodiments, In-app Browser 420 may generate a plurality of supplement HTTP request packets in order to obtain supplement data, e.g., upon obtaining a response to the initial HTTP request, upon rendering the target webpage, or the like. In some exemplary embodiments, a HTTP request packet, e.g., an initial or supplement request, may be absent of an indication of the referral source. For example, the HTTP request packet may not comprise a referral field indicating a referring source of the HTTP request. In some exemplary embodiments, absence of valid referral information may be due to the HTTP request being generated by In-app Browser 420.

Figure 5:
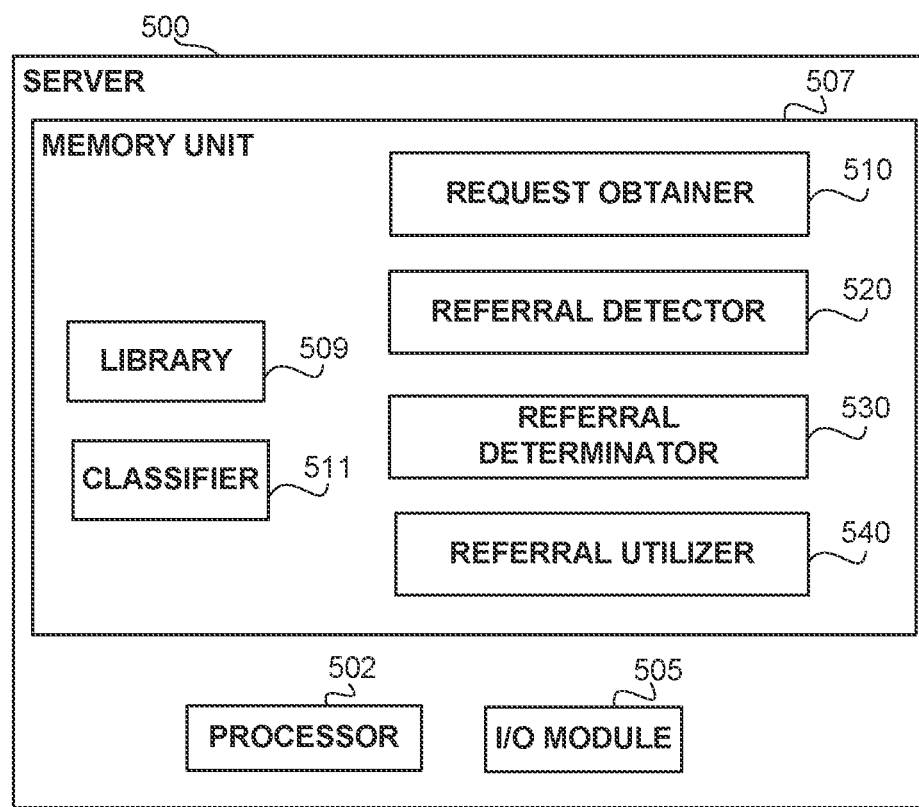
FIG. 5 shows a block diagram of an apparatus of a server, in accordance with some exemplary embodiments of the disclosed subject matter.

Referring now to FIG. 5 showing a block diagram of an apparatus of a server, in accordance with some exemplary embodiments of the disclosed subject matter.

In some exemplary embodiments, a Server 500 may comprise a Processor 502. Processor 502 may be a Central Processing Unit (CPU), a microprocessor, an electronic circuit, an Integrated Circuit (IC) or the like. Processor 502 may be utilized to perform computations required by Server 500 or any of its subcomponents. Processor 502 may be configured to execute computer-programs useful in performing the methods of FIGS. 1-2, or the like.

In some exemplary embodiments of the disclosed subject matter, an Input/Output (I/O) Module 505 may be utilized to provide an output to and receive input from a user. I/O Module 505 may be used to transmit and receive information to and from the user or any other apparatus, e.g., one or more servers, in communication therewith.

In some exemplary embodiments, Server 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Server 500. In some exemplary embodiments, Memory Unit 507 may retain program code operative to cause Processor 502 to perform acts associated with any of the steps in FIGS. 1-2, or the like.

In some exemplary embodiments, Memory Unit 507 may retain a Library 509 comprising one or more databases or repositories of conversion information. In some exemplary embodiments, Library 509 may enable to convert one or more headers or fields of an HTTP packet to referral information thereof. In other exemplary embodiments, Library 509 may be retained outside of Memory Unit 507, such as at a different server, a cloud server, a private apparatus to which access is enabled to the server, or the like.

In some exemplary embodiments, Memory Unit 507 may retain a Classifier 511 that is configured to classify an HTTP packet to a corresponding referral source, e.g., based on one or more headers or fields of an HTTP packet, on behavioral patterns, on Library 509, or the like. In other exemplary embodiments, Classifier 511 may be retained outside of Memory Unit 507, such as at a different server, a cloud server, a private apparatus to which access is enabled to the server, or the like. In some exemplary embodiments, Classifier 511 may be utilized instead of Library 509, in combination with Library 509, or alternatively, Library 509 may be used instead of Classifier 511.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Request obtainer 510 may be configured to obtain one or more HTTP requests from one or more user devices, e.g., via I/O Module 505 or via any other component or device. For example, Request obtainer 510 may obtain an HTTP request from User Device 400 (FIG. 4). Obtaining Module 510 may be configured to continuously monitor ports of I/O Module 505 to detect any communicated requests from user devices.

In some exemplary embodiments, Referral Detector 520 may be configured to detect or identify whether or not obtained requests, e.g., obtained by Request obtainer 510, have valid referral information. In some exemplary embodiments, Referral Detector 520 may determine whether or not an obtained request comprises an HTTP referrer field. Upon identifying that the request does not comprise an HTTP referrer field, Referral Detector 520 may determine that the request has no valid referral information. Upon identifying that the request comprises an HTTP referrer field, Referral Detector 520 may perform one or more tests, calculations, classifications, determinations, or the like, e.g., in accordance with Step 110 of FIG. 1, to identify whether the HTTP referrer field has a valid value. In some exemplary embodiments, Referral Detector 520 may identify whether the value of the HTTP referrer field can be used to determine a referring source, and in case it can, whether the referring source is probable in view of the user's behavior, classifications of similar values, a length of an address of the target resource, or the like. In case Referral Detector 520 determines that the HTTP referrer field can be used to determine a referring source and that the referring source is probable, e.g., overpasses a probability threshold, Referral Detector 520 may infer that the value of the HTTP referrer field is valid and may be utilized, for example, for future analytics, datasets, or the like. Otherwise, Referral Detector 520 may provide the obtained request to Referral Determinator 530 for further processing.

In some exemplary embodiments, Referral Determinator 530 may be configured to obtain from Referral Detector 520 one or more webpage requests that lack valid referral information, and to determine artificial referral information for the requests. In some exemplary embodiments, Referral Determinator 530 may determine artificial referral information for each request using one or more entries of Library 509, e.g., based on the user-agent field of the request. Additionally or alternatively, Referral Determinator 530 may determine the artificial referral information using Classifier 511, e.g., which may be trained on Library 509 or on any other dataset, and may be configured to match between requests or portions thereof and a corresponding referral source. Additionally or alternatively, Referral Determinator 530 may determine the artificial referral information using supplementary information, e.g., tracking information of the referring page, monitored user activities, popular links leading to the target location, or the like.

In some exemplary embodiments, Referral Utilizer 540 may be configured to utilize the artificial referral information for one or more purposes. In some exemplary embodiments, Referral Utilizer 540 may modify an obtained request or metadata associated to it by adding the corresponding artificial referral information thereto, e.g., as determined by Referral Determinator 530. In some exemplary embodiments, in case the request is modified, Referral Utilizer 540 may forward the modified request to one or more destination servers holding the destination webpage, in order to obtain the webpage and provide it to the requesting user device. In some exemplary embodiments, Referral Utilizer 540 may or may not modify a response to the request based on the artificial referral information. In some exemplary embodiments, Referral Utilizer 540 may utilize the artificial referral information for analytics, for adapting decisions or other actions of one or more servers, for adapting functionalities of servers or served content, for adapting served content, for adapting a served design, or the like.

It is noted that the disclosed subject matter is explained with respect to the currently popular HTTP protocol. However, the disclosed subject matter is not limited to such protocol and may be implemented with respect to other communication protocols.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   displaying a first webpage to a user via a browser of a user device, wherein the first webpage is not associated with a publisher;
   displaying a second webpage to the user via the browser, wherein the second webpage is associated with the publisher, wherein a previous location in the browser prior to the second webpage is the first webpage; and
   in response to a user instruction to return to a previous location from the second webpage, displaying an intermediate content webpage to the user via the browser of the user device, wherein the browser has not navigated to the intermediate content webpage prior to the user instruction to return to the previous location from the second webpage, where the intermediate content webpage was not shown to the user after the first webpage was displayed, wherein the intermediate content webpage is associated with the publisher, wherein the intermediate content webpage comprises a feed element displaying organic content to the user.

2. The method of claim 1, wherein subsequently after said displaying the second webpage, displaying a plurality of additional webpages to the user via the browser, wherein the plurality of additional webpages are associated with the publisher, wherein in response to a user instruction to return to a previous location from each of the additional webpages, returning to a previous location in accordance with a browsing history of the user, whereby provisioning the intermediate content webpage prior to a user leaving a website of the publisher.

3. The method of claim 1 further comprising a determination to display the intermediate content webpage, wherein the determination to display the intermediate content webpage is based on traffic origin.

4. The method of claim 1 further comprising a determination to display the intermediate content webpage, wherein the determination to display the intermediate content webpage is based on a referral information when displaying the second webpage.

5. The method of claim 1, wherein the feed element comprises content that is personalized for the user.

6. The method of claim 1, wherein the first webpage is associated with a social network, wherein the second webpage is comprised in a website of the publisher, wherein the second webpage is external to the social network.

7. The method of claim 1, wherein the first webpage is displayed to the user via an in-app browser, wherein the in-app browser is different than the browser.

8. The method of claim 1, wherein said displaying the intermediate content webpage comprises generating a new webpage to function as the intermediate content webpage.

9. The method of claim 1 further comprising in response to a user instruction to return to a previous location from the intermediate content webpage, displaying to the user the first webpage, whereby enabling the user to return to the first webpage by providing at least two instructions to return to a previous location.

10. The method of claim 1 further comprising manipulating a browsing history of the user device before receiving the user instruction to return to the previous location, wherein said manipulating comprises adding to the browsing history of the user device an additional page which was not displayed by the user device.

11. The method of claim 1, wherein the feed element displays a set of content cards, wherein the set of content cards comprise at least one organic content card and at least one sponsored content card.

12. A method comprising:
   monitoring browsing activity of a user, wherein the browsing activity is performed via a browser of a user device, wherein the browsing activity comprises reaching from a first webpage to a second webpage without navigating to any intermediate webpage therebetween, wherein the first webpage is not associated with a publisher, wherein the second webpage is associated with the publisher, wherein a previous location defined in the browser prior to reaching the second webpage is the first webpage; and
   circumventing a return to a previous location functionality of the user device by causing the browser to display an intermediate content webpage to the user instead of the first webpage in response to a user instruction to implement the previous location functionality at the second webpage, wherein the intermediate content webpage is associated with the publisher, wherein the intermediate content webpage comprises a feed element displaying organic content to the user, wherein the intermediate content webpage was not navigated to by the browser prior to being displayed by the intermediate content webpage.

13. The method of claim 12 further comprises implementing the previous location functionality in response to another instruction to perform the previous location functionality when displaying the intermediate content webpage, whereby causing the first webpage to be displayed to the user.

14. The method of claim 12, wherein the browsing activity of the user comprises visiting a plurality of webpages in a website of the publisher, after visiting the second webpage and backtracking to the second webpage.

15. The method of claim 12, wherein said circumventing comprises manipulating a browsing history mechanism of the browser to insert a page that was not browsed to by the browser to a browsing history of the browser, whereby the page is added to the browsing history mechanism of the browser without the browser navigating to the page.

16. A system comprising:
a server comprising a processor and memory;
a user device of a user comprising a processor and memory;
wherein said user device configured to execute a browser that is retained in said memory of said user device;
wherein said server and said user device are connected over a computerized network;
wherein said server is configured to process Hypertext Transfer Protocol (HTTP) requests from said user device and provide a response to the HTTP requests;
wherein the browser is configured to display a first webpage, wherein the first webpage is not associated with a publisher;
wherein the browser is configured to navigate from the first webpage directly to a second webpage, wherein the second webpage is associated with the publisher;
wherein the browser is configured to display to the user an intermediate content webpage in response to a user instruction to return to a previous location from the second webpage, wherein prior to user instruction, the browser has not visited the intermediate content webpage, wherein the previous location in accordance with a browsing history of the user prior to the second webpage is a first webpage, wherein the intermediate content webpage is associated with the publisher, wherein the intermediate content webpage comprises a feed element displaying organic content to the user.

17. The system of claim 16, wherein in accordance with the browsing history of the user, subsequently after the user visiting the second webpage, the user visited a plurality of additional webpages, wherein the plurality of additional webpages are associated with the publisher, wherein in response to a user instruction to return to a previous location from each of the additional webpages, the browser is configured to return to a previous location in accordance with the browsing history of the user, whereby the system is configured to provision the intermediate content webpage to the user prior to a user leaving a website of the publisher.

18. The system of claim 16, wherein a determination to display the intermediate content webpage is based on at least one of: traffic origin, and referral information.

19. The system of claim 16, wherein the feed element comprises content that is personalized for the user.

20. The system of claim 16, wherein the first webpage is associated with a social network, wherein the second webpage is comprised in a website of the publisher, wherein the second webpage is external to the social network.

21. The system of claim 16, wherein the user device retaining an application configured to utilize an in-app browser, wherein the in-app browser is configured to display the first webpage and to invoke, in response to a user instruction, the browser to display the second webpage.

22. The system of claim 16, wherein the browser comprises a browsing history mechanism, wherein said system is configured to manipulate the browsing history mechanism of the browser to insert a webpage to a browsing history of the browser, wherein the inserted webpage is utilized to cause the browser to display the intermediate content webpage.

23. A computer program product comprising a non-transitory computer readable storage medium retaining program instructions, which program instructions when read by a processor, cause the processor to:
display a first webpage to a user via a browser of a user device, wherein the first webpage is not associated with a publisher;
display a second webpage to the user via the browser wherein the second webpage is associated with the publisher, wherein a previous location in the browser prior to the second webpage is the first webpage; and
in response to a user instruction to return to a previous location from the second webpage, display an intermediate content webpage to the user via the browser of the user device, wherein the browser has not navigated to the intermediate content webpage prior to the user instruction to return to the previous location from the second webpage, wherein the intermediate content webpage was not shown to the user after the first webpage was displayed, wherein the intermediate content webpage is associated with the publisher, wherein the intermediate content webpage comprises a feed element displaying organic content to the user.

24. The computer program product of claim 23, wherein the program instructions when read by the processor, cause the processor to: determine to display the intermediate content webpage, wherein the determination to display the intermediate content webpage is based on at least one of: traffic origin and a referral information when displaying the second webpage.

25. The computer program product of claim 23, wherein the feed element comprises content that is personalized for the user.

26. The computer program product of claim 23, wherein the first webpage is associated with a social network, wherein the second webpage is comprised in a website of the publisher, wherein the second webpage is external to the social network.

27. The computer program product of claim 23, wherein the program instructions when read by the processor, cause the processor to: display the first webpage to the user in response to a user instruction to return to a previous location from the intermediate content webpage, whereby enabling the user to return to the first webpage by providing at least two instructions to return to a previous location.

28. The computer program product of claim 23, wherein the program instructions when read by the processor, cause the processor to: manipulate a browsing history mechanism of the browser, wherein the browsing history mechanism is manipulated before receiving the user instruction to return to the previous location, wherein the browsing history is manipulated by adding to a browsing history of the user device an additional page which was not displayed by the user device.

* * * * *